United States Patent
Takahashi et al.

(10) Patent No.: US 11,305,521 B2
(45) Date of Patent: Apr. 19, 2022

(54) THERMAL TRANSFER APPARATUS AND TRANSFER METHOD

(71) Applicant: DGSHAPE Corporation, Hamamatsu (JP)

(72) Inventors: Fumihiro Takahashi, Hamamatsu (JP); Hiroshi Oe, Hamamatsu (JP); Tsutomu Kuno, Hamamatsu (JP)

(73) Assignee: DGSHAPE CORPORATION, Shizuoka (JP)

( * ) Notice: Subject to any disclaimer, the term of this patent is extended or adjusted under 35 U.S.C. 154(b) by 61 days.

(21) Appl. No.: 16/566,995

(22) Filed: Sep. 11, 2019

(65) Prior Publication Data

US 2020/0114635 A1 Apr. 16, 2020

(30) Foreign Application Priority Data

Oct. 10, 2018 (JP) .............................. JP2018-191728

(51) Int. Cl.
*B32B 37/00* (2006.01)
(52) U.S. Cl.
CPC .... *B32B 37/025* (2013.01); *B32B 2310/0806* (2013.01)
(58) Field of Classification Search
CPC .......... B32B 37/025; B32B 37/26; B32B 2310/0806; B32B 2310/0843; B32B 2038/0064; B32B 41/00; B41M 5/46; B44C 1/1716; B44C 1/1729; B44C 1/005; B44C 1/14; B44C 1/145; B44C 1/24; B44C 3/082; B41F 16/004; B41F 16/0046; B41F 16/0053; B41J 2/475; Y10T 156/1705; B44B 5/0052; B44B 5/0071; B44B 5/0095
USPC .......................... 156/230, 233, 234, 235, 535
See application file for complete search history.

(56) References Cited

U.S. PATENT DOCUMENTS

2006/0266795 A1* 11/2006 Heckenthaler ........ B44C 1/1729
228/101
2018/0111409 A1 4/2018 Takahashi

FOREIGN PATENT DOCUMENTS

| JP | 2005313465 A | * | 11/2005 |
| JP | 2016215599 A | * | 12/2016 |
| JP | 2018-069501 A |   | 5/2018 |

OTHER PUBLICATIONS

Machine translation of JP 2016215599 date unknown.*
Machine translation of JP 2005313465 date unknown.*

* cited by examiner

*Primary Examiner* — John L Goff, II
(74) *Attorney, Agent, or Firm* — Keating & Bennett, LLP

(57) ABSTRACT

A thermal transfer apparatus includes a controller to control a transfer tool and a pressing body conveyor. The controller controls the pressing body conveyor to press a predetermined region of a transfer object, and controls the transfer tool and the pressing body conveyor to press at least a portion of thermal transfer foil placed on the predetermined region pressed by the transfer tool and a light absorption film having a light absorption property and placed on the thermal transfer foil and to apply light to the light absorption film.

6 Claims, 7 Drawing Sheets

THERMAL TRANSFER APPARATUS AND TRANSFER METHOD

CROSS REFERENCE TO RELATED APPLICATIONS

This application claims the benefit of priority to Japanese Patent Application No. 2018-191728 filed on Oct. 10, 2018. The entire contents of this application are hereby incorporated herein by reference.

BACKGROUND OF THE INVENTION

1. Field of the Invention

The present invention relates to a thermal transfer apparatus and a transfer method. In particular, the present invention relates to a thermal transfer apparatus and a transfer method for transferring foil onto a transfer object using thermal transfer foil.

2. Description of the Related Art

A decorative process by a heat transfer technique using thermal transfer foil (also called a heat transfer sheet) has been performed to date for purposes such as enhancement of aesthetic design. The thermal transfer foil is generally constituted by stacking a base material, a decorative layer, and an adhesive layer in this order. In transfer (i.e., transfer of thermal transfer foil to a transfer object), thermal transfer foil is overlaid on the transfer object such that an adhesive layer of the foil contacts the transfer object, and the thermal transfer foil is heated by applying light to the thermal transfer foil while the thermal transfer foil from above is pressed with a transfer tool (e.g., a laser pen) including a light source for applying light (e.g., laser light). Accordingly, the adhesive layer in a pressed portion of the thermal transfer foil is melted and attached to the surface of the transfer object, and then is cured by heat dissipation. Consequently, the base material of the thermal transfer foil is separated from the transfer object so that a decorative layer having a shape corresponding to the portion stamped with foil can be attached to the transfer object together with the adhesive layer. In this manner, the surface of the transfer object is provided with a decoration of foil having an intended shape (e.g., a figure or a character).

Japanese Patent Application Publication No. 2018-69501, for example, discloses a technique for transferring foil onto a transfer object with a transfer tool that applies laser light.

Examples of some transfer objects onto which thermal transfer foil is to be transferred include a member whose surface onto which thermal transfer foil is to be transferred has a small amount of surface unevenness and is relatively smooth and a member whose surface onto which thermal transfer foil is to be transferred has a large amount of surface unevenness and is relatively coarse. In either case, although thermal transfer foil can be transferred onto the transfer object, transfer of the thermal transfer foil is less appropriately performed on a member having a large amount of surface unevenness than a member having a small amount of surface unevenness in some cases.

SUMMARY OF THE INVENTION

Preferred embodiments of the present invention provide thermal transfer apparatuses each capable of transferring thermal transfer foil onto a transfer object more appropriately.

A thermal transfer apparatus according to a preferred embodiment of the present includes a stand that holds a transfer object, a transfer tool to press the transfer object and to apply light to the transfer object, a conveyor that moves one of the stand and the transfer tool relative to the other, and a controller that controls the transfer tool and the conveyor, wherein the controller controls at least the conveyor such that a predetermined region of the transfer object is pressed by the transfer tool, and controls the transfer tool and the conveyor such that at least a portion of thermal transfer foil placed on the predetermined region pressed by the transfer tool and a light absorption film having a light absorption property and placed on the thermal transfer foil is pressed, and light is applied to the light absorption film.

A thermal transfer apparatus according to a preferred embodiment of the present invention includes a controller to control a transfer tool and a conveyor. The controller controls at least the conveyor to press a predetermined region of a transfer object. In this manner, since the predetermined region of the transfer object is pressed by the transfer tool before thermal transfer foil is transferred to the predetermined region, the predetermined region of the transfer object is smoother than that before pressing. The controller controls the transfer tool and the conveyor to press at least a portion of thermal transfer foil and the light absorption film disposed on the smooth predetermined region, while (at the same time) applying light to the light absorption film. Accordingly, the thermal transfer foil is able to be more appropriately transferred onto the predetermined region of the transfer object.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described hereinafter with reference to the drawings as necessary. The preferred embodiments described here are, of course, not intended to particularly limit the present invention. Elements and features having the same functions are denoted by the same reference numerals, and description for the same elements, features, and portions will not be repeated or will be simplified as appropriate.

Figure 1:
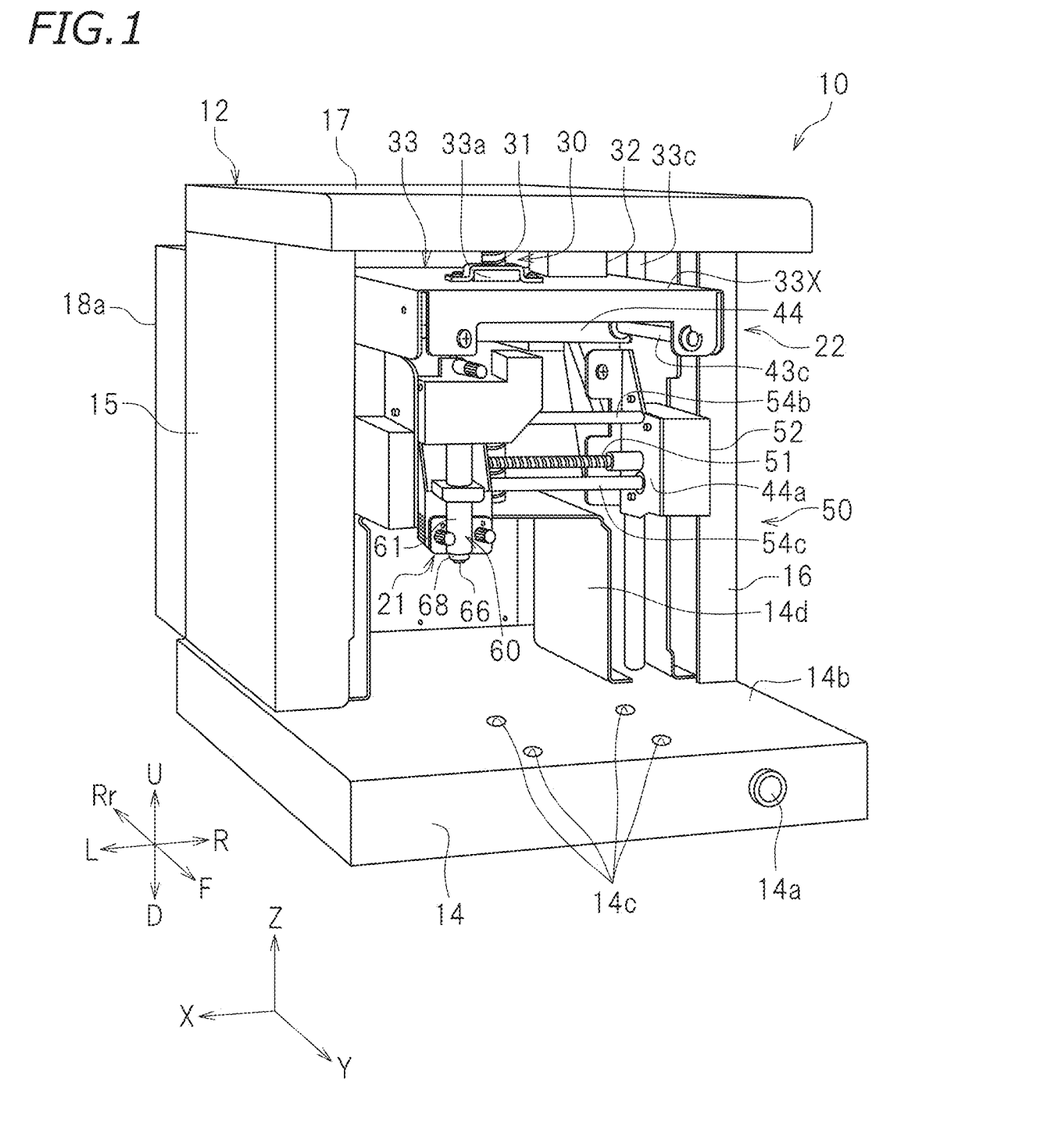
FIG. 1 is a perspective view schematically illustrating a thermal transfer apparatus according to a preferred embodiment of the present invention.
Figure 2:
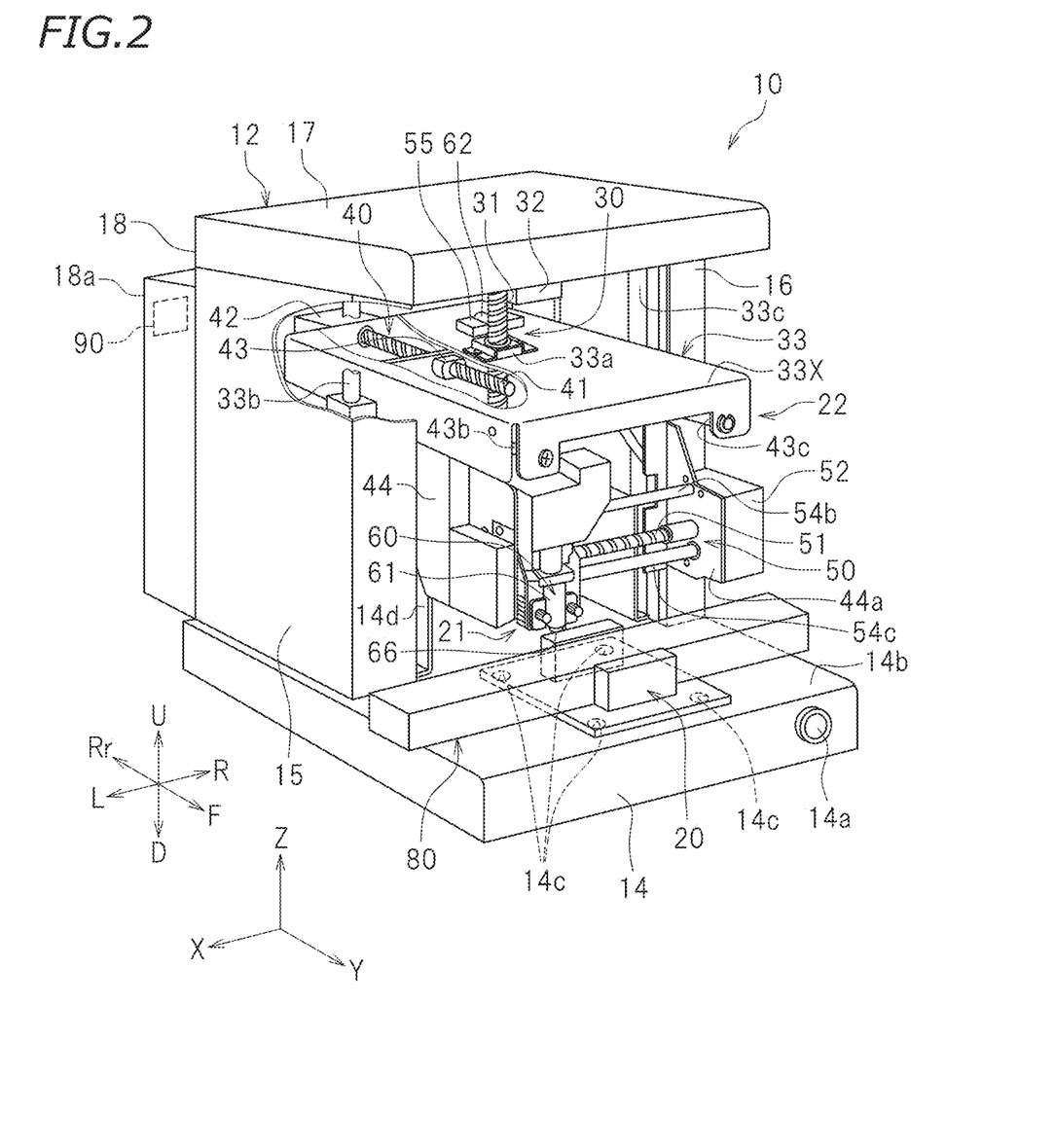
FIG. 2 is a partially broken perspective view schematically illustrating a thermal transfer apparatus according to a preferred embodiment of the present invention.
Figure 3:
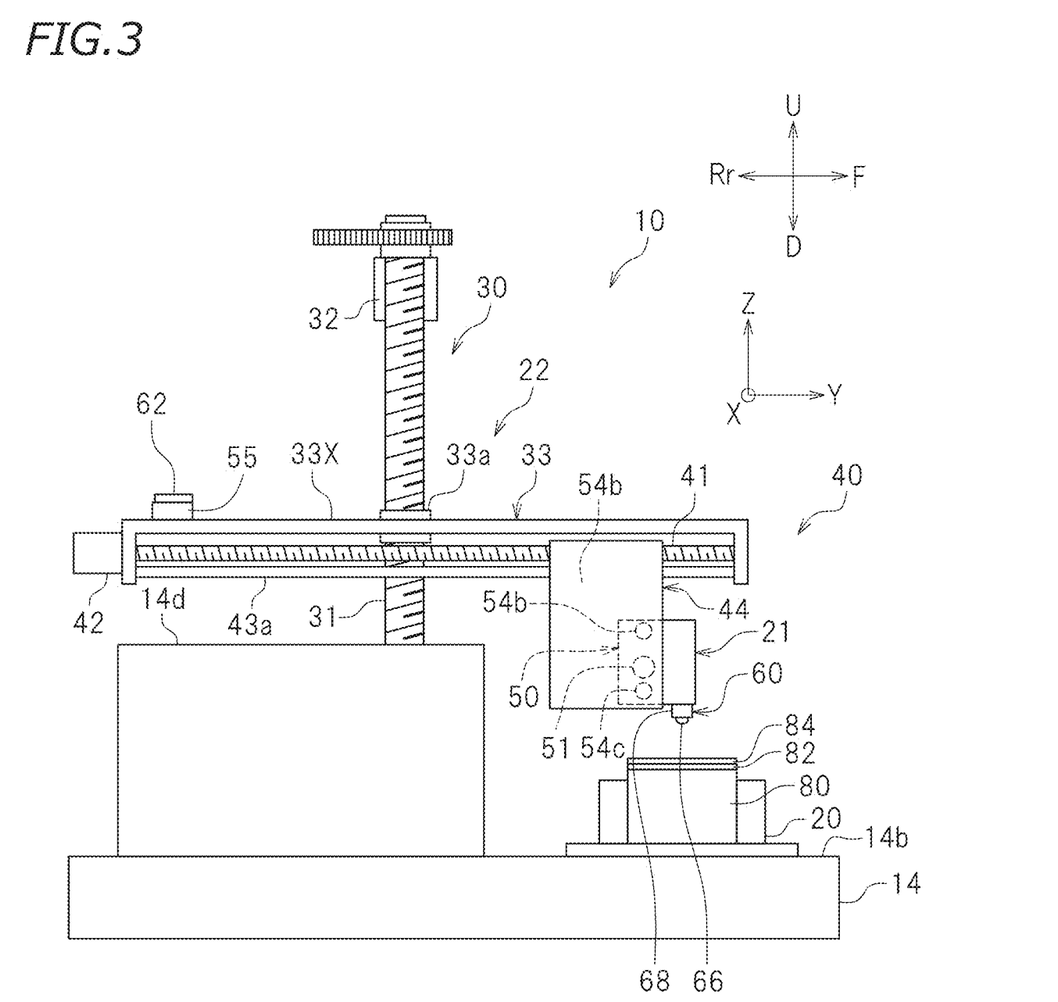
FIG. 3 is a left side view schematically illustrating a pressing body conveyor according to a preferred embodiment of the present invention.

First, a configuration of a thermal transfer apparatus 10 will be described. FIG. 1 is a perspective view schematically illustrating the thermal transfer apparatus 10. FIG. 2 is a partially broken perspective view schematically illustrating an aspect of the thermal transfer apparatus 10. FIG. 3 is a left side view schematically illustrating a pressing body conveyor 22 during transfer. In the following description, left, right, up, and down refer to left, right, up, and down, respectively, when an operator (user) in front of the thermal transfer apparatus 10 sees a power supply switch 14*a*. When seen from the operator, a direction toward the thermal transfer apparatus 10 will be referred to as rearward, and a direction away from the thermal transfer apparatus 10 will be referred to as forward. Characters F, Rr, L, R, U, and D in the drawings represent front, rear, left, right, up, and down, respectively. Suppose axes orthogonal to one another are an X axis, a Y axis, and a Z axis, the thermal transfer apparatus 10 according to this preferred embodiment is placed on a plane constituted by the X axis and the Y axis. Here, the X axis extends leftward and rightward. The Y axis extends forward and rearward. The Z axis extends upward and downward. It should be noted that these directions are defined simply for convenience of description, and do not limit the state of installation of the thermal transfer apparatus 10.

As illustrated in FIG. 3, the thermal transfer apparatus 10 is an apparatus that applies (also referred to as transfers) a decorative layer in a sheet-shaped thermal transfer foil 82 to a surface of a transfer object 80 by pressing and heating the thermal transfer foil 82 and a light absorption film 84 by using a transfer tool 60 described later with the thermal transfer foil 82 and the light absorption film 84 overlaid on the transfer object 80. The thermal transfer foil 82 is indirectly pressed against the transfer tool 60 with the light absorption film 84 interposed therebetween. With some materials, shapes, and configurations, for example, of the transfer object 80 and the thermal transfer foil 82, the light absorption film 84 may be omitted.

The transfer object 80 is not limited to a specific material and a specific shape. Examples of materials for the transfer object 80 include metals such as gold, silver, copper, platinum, brass, aluminum, iron, titanium, and stainless, resin materials such as acrylic, polyvinyl chloride (PVC), polyethylene terephthalate (PET), and polycarbonate (PC), papers such as plain paper, drawing paper, and Japanese paper, and rubbers. The transfer object 80 may also be a human-made leather (e.g., an artificial leather or a synthetic leather) at least partially including the resin materials.

The thermal transfer foil 82 may be, but is not limited to, transfer foil commercially available for heat transfer, for example. The thermal transfer foil 82 is typically a stack of a base material, a decorative layer, and an adhesive layer in this order. The thermal transfer foil 82 includes, for example, metallic foil such as gold foil and sliver foil, half metallic foil, pigment foil, multi-color printing foil, hologram foil, and electrostatic destruction measures foil. The thermal transfer foil 82 has a band shape or a sheet shape. The thermal transfer foil 82 is placed on the transfer object 80. The thermal transfer foil 82 is placed on the transfer object 80 such that the adhesive layer of the thermal transfer foil 82 contacts the transfer object 80. The thermal transfer foil 82 may further include a light absorption layer between the base material and the decorative layer. In a case where the thermal transfer foil 82 includes a light absorption layer, the base material is made of a transparent material. The light absorption layer has a configuration similar to that of the light absorption film 84 described later. In the case where the thermal transfer foil 82 includes the light absorption layer, the thermal transfer apparatus 10 does not need to include the light absorption film 84 in some cases. Even in the case where the thermal transfer foil 82 includes the light absorption layer, the thermal transfer apparatus 10 preferably includes the light absorption film 84.

Some configurations of the thermal transfer foil 82 to be used may have no or poor light absorption property to light applied from a light source 62 (see FIG. 2) of the transfer tool 60 described later. In such cases, the light absorption film 84 is placed on top of the thermal transfer foil 82. The light absorption film 84 refers to a sheet configured to efficiently absorb light in a predetermined wavelength range (e.g., laser light) applied from the light source 62 of the transfer tool 60 and capable of converting optical energy to thermal energy. The light absorption film 84 has a heat resistance at about 100° C. to about 200° C., for example. The light absorption film 84 is made of a resin such as polyimide. The light absorption film 84 is monochrome. From the viewpoint of efficiently converting optical energy to thermal energy, the hue of the light absorption film 84 is preferably complementary to the color of light (e.g., laser light) applied from the light source 62. For example, in a case where light (e.g., laser light) from the light source 62 is blue, the light absorption film 84 is preferably yellow. The light absorption film 84 may be provided with a support film to increase strength as necessary. The support film has a light absorption property significantly lower than that of the light absorption film 84. The support film is made of a material transparent to laser light emitted from the light source 62. The support film is, for example, transparent. The support film is a plastic film such as polyester.

As illustrated in FIG. 1, the thermal transfer apparatus 10 has a box shape. The thermal transfer apparatus 10 includes a housing 12 that is open at the front, a pressing body conveyor 22 disposed in the housing 12, a carriage 21, and the transfer tool 60. The housing 12 includes a bottom wall 14, a left side wall 15, a right side wall 16, an upper wall 17, and a rear wall 18 (see FIG. 2). The housing 12 is made of a steel plate, for example.

As illustrated in FIG. 2, a fixture 20 such as a vice is detachably attached to the bottom wall 14. The fixture 20 is an example of a stand to hold the transfer object 80. A front region of the bottom wall 14 is a fixture placing region 14*b* to place the fixture 20. A center portion of the fixture placing region 14*b* includes four attachment holes 14*c* to attach the fixture 20, for example. A front surface of the bottom wall 14 is provided with the power supply switch 14*a*.

As illustrated in FIG. 2, the left side wall 15 extends upward at the left end of the bottom wall 14. The left side wall 15 is perpendicular or substantially perpendicular to the bottom wall 14. The right side wall 16 extends upward at the right end of the bottom wall 14. The right side wall 16 is perpendicular or substantially perpendicular to the bottom wall 14. The rear wall 18 extends upward at the rear end of the bottom wall 14. The rear wall 18 is connected to the rear end of the left side wall 15 and the rear end of the right side wall 16. The rear wall 18 is provided with a box-shaped case 18*a*. The case 18*a* houses a controller 90 described later. The upper wall 17 is connected to the upper end of the left side wall 15, the upper end of the right side wall 16, and the upper end of the rear wall 18. A portion of a first conveyor 30 described later of the pressing body conveyor 22 is disposed on the upper wall 17. A region surrounded by the bottom wall 14, the left side wall 15, the right side wall 16, the upper wall 17, and the rear wall 18 is an internal space of the housing 12.

The internal space of the housing 12 is a space where the thermal transfer foil 82 is transferred onto the transfer object 80. The pressing body conveyor 22 is provided in the internal space. That is, the pressing body conveyor 22 is housed in the housing 12. The pressing body conveyor 22 is an example of the conveyor. The pressing body conveyor 22 includes a carriage 21, the first conveyor 30 that moves the carriage 21 along the Z axis, a second conveyor 40 that moves the carriage 21 along the Y axis, and a third conveyor 50 that moves the carriage 21 along the X axis. The carriage 21 is disposed below an elevation base 33 described later. The pressing body conveyor 22 moves the carriage 21 in three dimensions. The carriage 21 is movable relative to the fixture 20 (i.e., the transfer object 80) by the first conveyor 30, the second conveyor 40, and the third conveyor 50. That is, the pressing body conveyor 22 moves a pressing body 66 mounted on the carriage 21 relative to the fixture 20. The first conveyor 30, the second conveyor 40, and the third conveyor 50 are disposed above the bottom wall 14.

As illustrated in FIG. 1, the first conveyor 30 moves the carriage 21 along the Z axis (upward and downward). That is, the first conveyor 30 moves the pressing body 66 of the transfer tool 60 disposed on the carriage 21 along the Z axis. The first conveyor 30 preferably is a feed screw mechanism including a Z-axis feed screw rod 31, a Z-axis moving motor 32, and a feed nut 33*a*. The Z-axis feed screw rod 31 extends along the Z axis. The Z-axis feed screw rod 31 includes a helical screw groove. An upper portion of the Z-axis feed screw rod 31 is fixed to the upper wall 17. An upper end portion of the Z-axis feed screw rod 31 penetrates the lower surface of the upper wall 17 along the Z axis, and is partially disposed inside the upper wall 17. A lower end portion of the Z-axis feed screw rod 31 is rotatably supported on a frame 14*d* (see also FIG. 3). The frame 14*d* is fixed onto the bottom wall 14. The Z-axis moving motor 32 is an electric motor. The Z-axis moving motor 32 is connected to the controller 90 (see FIG. 2). The Z-axis moving motor 32 is fixed to the upper wall 17. A driving shaft of the Z-axis moving motor 32 penetrates the lower surface of the upper wall 17 along the Z axis and is partially disposed inside the upper wall 17. In the upper wall 17, the Z-axis feed screw rod 31 is coupled to the Z-axis moving motor 32. The Z-axis moving motor 32 causes the Z-axis feed screw rod 31 to rotate.

As illustrated in FIG. 2, the feed nut 33*a* having a screw thread is engaged with the Z-axis feed screw rod 31. The feed nut 33*a* is coupled to an elevation base 33. The feed nut 33*a* penetrates the upper surface of the elevation base 33 along the Z axis. The elevation base 33 is supported on the Z-axis feed screw rod 31 with the feed nut 33*a* interposed therebetween. The elevation base 33 is parallel or substantially parallel to the bottom wall 14. The lengths of the elevation base 33 along the X axis and the Y axis are larger than the lengths of the fixture placing region 14*b* along the X axis and the Y axis. As illustrated in FIG. 2, slide shafts 33*b* and 33*c* each extending along the Z axis are provided at the inner sides of the left side wall 15 and the right side wall 16. The slide shafts 33*b* and 33*c* are parallel or substantially parallel to the Z-axis feed screw rod 31. The slide shafts 33*b* and 33*c* are disposed to enable the elevation base 33 to slide along the Z axis. When the Z-axis moving motor 32 is driven, rotation of the Z-axis feed screw rod 31 causes the elevation base 33 to move up and down along the slide shafts 33*b* and 33*c*. The second conveyor 40 and the third conveyor 50 are coupled to the elevation base 33. Thus, the second conveyor 40 and the third conveyor 50 integrally move up and down with upward and downward movement of the elevation base 33. The carriage 21 moves up and down with upward and downward movement of the elevation base 33.

As illustrated in FIG. 2, the second conveyor 40 moves the carriage 21 along the Y axis (forward and rearward). That is, the second conveyor 40 moves the pressing body 66 of the transfer tool 60 disposed on the carriage 21 along the Y axis. The second conveyor 40 is a feed screw mechanism including a Y-axis feed screw rod 41, a Y-axis moving motor 42, and a feed nut 43. The Y-axis feed screw rod 41 extends along the Y axis. The Y-axis feed screw rod 41 is disposed on the elevation base 33. The Y-axis feed screw rod 41 includes a helical screw groove. A rear end portion of the Y-axis feed screw rod 41 is coupled to the Y-axis moving motor 42. The Y-axis moving motor 42 is an electric motor. The Y-axis moving motor 42 is connected to the controller 90. The Y-axis feed moving 42 is fixed to the rear of the elevation base 33. The Y-axis moving motor 42 causes the Y-axis feed screw rod 41 to rotate. A feed nut 43 including a screw thread is engaged with a screw groove of the Y-axis feed screw rod 41. A pair of slide shafts 43*b* and 43*c* extending along the Y axis is disposed on the elevation base 33. The two slide shafts 43*b* and 43*c* are parallel or substantially parallel to the Y-axis feed screw rod 41. A slide base 44 is provided on the slide shafts 43*b* and 43*c* to be slidable along the Y axis. When the Y-axis moving motor 42 is driven, rotation of the Y-axis feed screw rod 41 causes the slide base 44 to move forward and rearward along the slide shafts 43*b* and 43*c*.

As illustrated in FIG. 1, the third conveyor 50 moves the carriage 21 along the X axis (leftward and rightward). That is, the third conveyor 50 moves the pressing body 66 of the transfer tool 60 disposed on the carriage 21 along the X axis. The third conveyor 50 is a feed screw mechanism including an X-axis feed screw rod 51, an X-axis moving motor 52, and an unillustrated feed nut. The X-axis feed screw rod 51 extends along the X axis. The X-axis feed screw rod 51 is disposed ahead of the slide base 44. The X-axis feed screw rod 51 includes a helical screw groove. An end of the X-axis feed screw rod 51 is coupled to the X-axis moving motor 52. The X-axis moving motor 52 is an electric motor. The X-axis moving motor 52 is connected to the controller 90 (see FIG. 2). The X-axis moving motor 52 is disposed ahead of the slide base 44 and is fixed to a plate 44*a* extending forward. The X-axis moving motor 52 causes the X-axis feed screw rod 51 to rotate. A feed nut including a screw thread is engaged with a screw groove of the X-axis feed screw rod 51. A pair of slide shafts 54*b* and 54*c* extending along the X axis is disposed ahead of the slide base 44. The two slide shafts 54*b* and 54*c* are parallel or substantially parallel to the X-axis feed screw rod 51. The carriage 21 is disposed on the slide shafts 54*b* and 54*c* to be slidable along the X axis. When the X-axis moving motor 52 is driven, rotation of the X-axis feed screw rod 51 causes the carriage 21 to move leftward and rightward along the slide shafts 54*b* and 54*c*.

Figure 4:
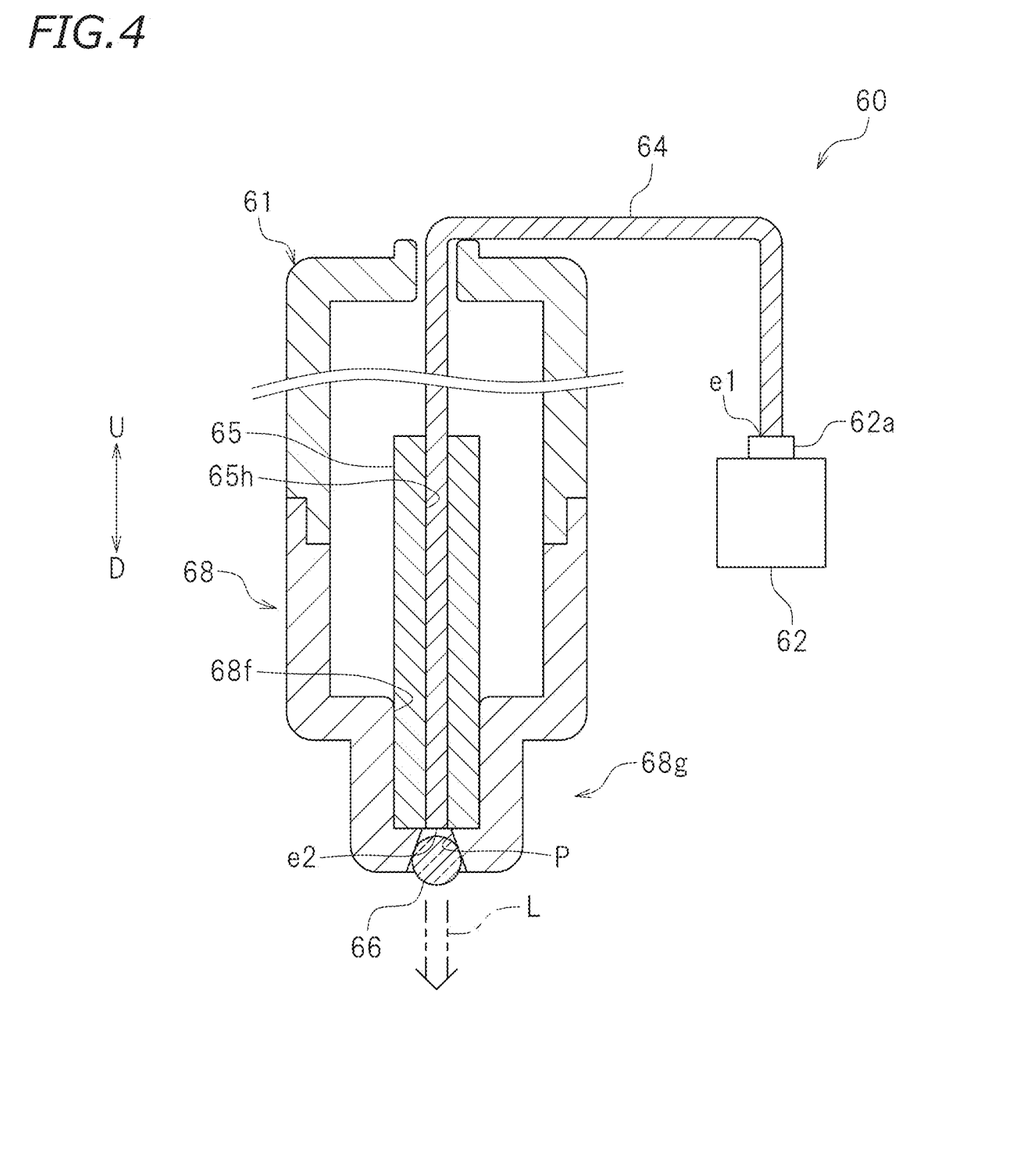
FIG. 4 is a cross-sectional view schematically illustrating a transfer tool according to a preferred embodiment of the present invention.

FIG. 4 is a cross-sectional view schematically illustrating the thermal transfer tool 60 according to a preferred embodiment of the present invention. The transfer tool 60 presses the thermal transfer foil 82 placed on the transfer object 80, while applying light (e.g., laser light) to the transfer object 80. The transfer tool 60 applies light to the thermal transfer foil 82 and the light absorption film 84 placed on the transfer object 80 to supply heat to the thermal transfer foil 82. In this preferred embodiment, the transfer tool 60 presses a protective film 86 described later and the transfer object 80, while applying laser light to the protective film 86 to supply heat to the transfer object 80. The transfer tool 60 presses the thermal transfer foil 82 and the light absorption film 84, while applying laser light to the light absorption film 84 to supply heat to the thermal transfer foil 82. The transfer tool 60 transfers the thermal transfer foil 82 onto the transfer object 80. The transfer tool 60 is disposed above the fixture 20. The transfer tool 60 includes the light source 62, a pen body 61, and the pressing body 66 fixed to the lower end of the pen body 61. The expression "pressing the transfer object 80" includes a case where the pressing body 66 of the transfer tool 60 contacts the transfer object 80 to press the transfer object 80 directly and a case where the pressing body 66 presses the transfer object 80 indirectly with the protective film 86 interposed between the pressing body 66 and the transfer object 80.

The light source 62 supplies heat to the thermal transfer foil 82. The light source 62 applies light serving as a heat source to the light absorption layer of the thermal transfer foil 82 and the light absorption film 84. Light supplied from the light source 62 to the light absorption layer of the thermal transfer foil 82 and the light absorption film 84 is converted to thermal energy in the light absorption layer and the light absorption film 84 and heats the thermal transfer foil 82. The light source 62 is communicably connected to the controller 90. The light source 62 is controlled by the controller 90. As illustrated in FIG. 2, the light source 62 is disposed on an upper surface 33X of the elevation base 33. The light source 62 is housed in a metal case 55. The case 55 is not limited to a specific material, and is made of, for example, aluminum having high thermal conductivity. The case 55 is fixed to the upper surface 33X of the elevation base 33. The light source 62 in the present preferred embodiment preferably is a laser diode (semiconductor laser) that applies laser light and an optical system, for example. Since laser light shows a high response speed, a change in, for example, energy of the laser light as well as switching between application and non-application of the light is able to be performed quickly. Accordingly, laser light having desired properties can be applied to the light absorption layer of the thermal transfer foil 82 and the light absorption film 84.

As illustrated in FIG. 1, the pen body 61 is held by the carriage 21. As illustrated in FIG. 4, the pen body 61 has an elongated cylindrical shape. The pen body 61 is oriented to have its longitudinal direction coincide with the upward and downward directions (i.e., the Z axis). The axis of the pen body 61 extends upward and downward. The pen body 61 incorporates optical fibers 64 and a ferrule 65. The pen body 61 includes a holder 68 described later. The holder 68 is attached to the lower end of the pen body 61.

The optical fibers 64 are an optical transfer medium to transfer light applied from the light source 62. The optical fibers 64 include a core portion (not shown) through which light passes and a cladding portion (not shown) that surrounds the core portion and reflects light. The optical fibers 64 are connected to the light source 62. The optical fibers 64 include an upper end e1 extending to the outside of the pen body 61. The end e1 of the optical fibers 64 is inserted in a connector 62a included in the light source 62. With this configuration, the optical fibers 64 are connected to the light source 62 with a reduced optical loss. The optical fibers 64 have a lower end e2 equipped with the ferrule 65. The ferrule 65 is a cylindrical optical photojunction. The ferrule 65 has a through hole 65h penetrating the ferrule 65 along the axis of the ferrule 65. The end e2 of the optical fibers 64 is inserted in the through hole 65h of the ferrule 65.

As illustrated in FIG. 4, the pen body 61 is provided with the holder 68. The holder 68 is disposed at the lower end of the pen body 61 and used to hold the ferrule 65 at a predetermined position. The holder 68 has a cap shape. An upper portion of the holder 68 has a cylindrical shape whose outer diameter corresponds to the pen body 61. A lower portion of the holder 68 includes a cylindrical projection 68g whose outer diameter is smaller than that of the pen body 61. The projection 68g includes a ferrule holding portion 68f that is a cylindrical recess. The ferrule holding portion 68f has an inner diameter corresponding to the outer diameter of the ferrule 65. The ferrule holding portion 68f houses the lower end of the ferrule 65.

The holder 68 has an aperture P penetrating the holder 68 upward and downward. The core portion of the end e2 of the optical fibers 64 is exposed to the outside through the aperture P. That is, in bottom view, the core portion of the end e2 of the optical fibers 64 overlaps the aperture P. Accordingly, the holder 68 does not interfere with an optical path L of laser light. Consequently, laser light applied from the light source 62 is able to be emitted to the outside from the lower end of the pan body 61.

The holder 68 also holds the pressing body 66 at a predetermined position on the lower end of the pen body 61. The pressing body 66 presses the transfer object 80 and the thermal transfer foil 82 placed on the transfer object 80. The pressing body 66 is configured to press the transfer object 80 and the thermal transfer foil 82 with downward movement of the elevation base 33. In this preferred embodiment, the pressing body 66 further presses the light absorption film 84 and the transfer object 80. The pressing body 66 is detachably provided in the holder 68. In this preferred embodiment, the pressing body 66 is spherical. The pressing body 66 is made of a hard material. The pressing body 66 is not strictly limited to a specific hardness, and is made of, for example, a material having a Vickers hardness of about 100 HV0.2 or more (e.g., about 500 HV0.2 or more). The holder 68 holds the pressing body 66 on the optical path L of laser light. The pressing body 66 is made of a material through which laser light emitted from the light source 62 passes. Accordingly, even in a case where the pressing body 66 is disposed on the optical path L, laser light passes through the pressing body 66. The pressing body 66 may be made of, for example, glass. The pressing body 66 according to the present preferred embodiment is made of synthetic quartz glass.

The expression "transparent to laser light" refers to having a predetermined transmittance of laser light. Specifically, "transparent to laser light to the pressing body 66" refers to having a predetermined laser light transmittance to the pressing body 66. For example, the predetermined laser light transmittance is about 50% or more. The predetermined laser light transmittance is preferably about 70% or more. The predetermined laser light transmittance is more preferably about 80% or more. The predetermined laser light transmittance is especially preferably about 85% or more. The predetermined laser light transmittance is most preferably about 90% or more. The transmittance refers to a transmittance including a surface reflection loss of a sample having a predetermined thickness (e.g., about 10 mm) measured in accordance with JIS R3106:1998, for example.

Figure 5:
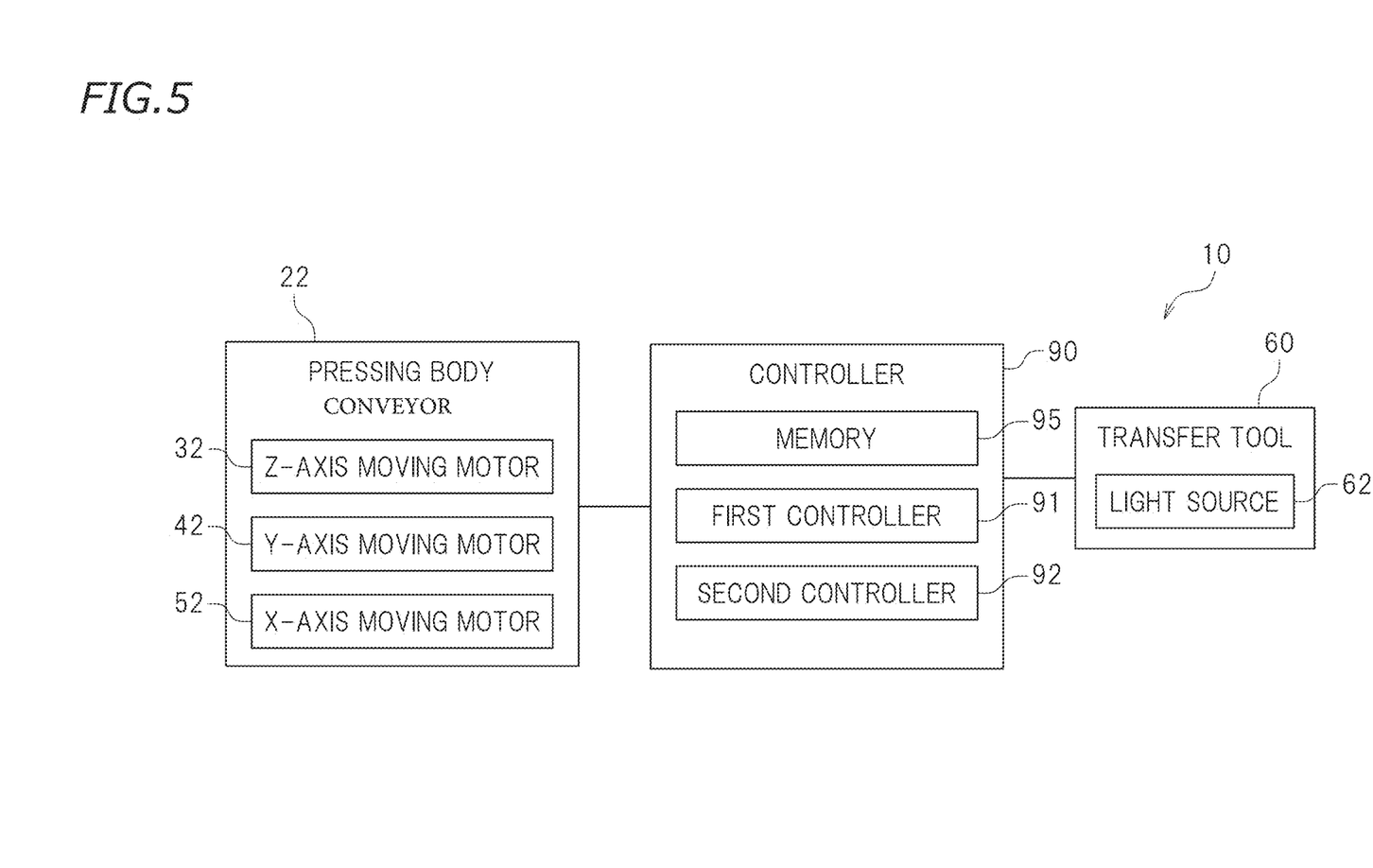
FIG. 5 is a block diagram of a thermal transfer apparatus according to a preferred embodiment of the present invention.

An overall operation of the thermal transfer apparatus 10 is controlled by the controller 90. As illustrated in FIG. 5, the controller 90 is communicably connected to the pressing body conveyor 22, the light source 62 of the transfer tool 60, and is configured or programmed to enable control of the pressing body conveyor 22 and the light source 62. The controller 90 is communicably connected to the Z-axis moving motor 32, the Y-axis moving motor 42, and the X-axis moving motor 52 and is configured or programmed to enable control of these motors. The controller 90 is typically a computer. The controller 90 includes, for example, an interface (I/F) that receives foil transfer data and other data from external equipment such as a host computer, a central processing unit (CPU) that executes instructions of a control program, a ROM that stores programs to be executed by the CPU, a RAM to be used as a working area where a program is developed, and a memory device such as a memory to store the programs and various types of data.

As illustrated in FIG. 5, a controller 90 includes a memory 95, a first controller 91, and a second controller 92. The functions of these elements of the controller 90 may be implemented by a program. This program may be read from a recording medium such as a CD or a DVD. This program may be downloaded through the Internet. The functions of the elements of the controller 90 may be implemented by, for example, processor(s) and/or circuit(s). Specific function or functions of each portions or elements of the controller 90 described above will be described later.

The memory 95 stores first image data representing a shape (e.g., a figure or a character) of a predetermined region 80T (see FIG. 7) of the transfer object 80 pressed by the transfer tool 60. The memory 95 stores second image data representing a shape (e.g., a figure or a character) of the thermal transfer foil 82 in transferring the thermal transfer foil 82 onto the transfer object 80. The first image data and the second image data may be the same or different from each other. In the case where the first image data and the second image data are different, the shape of the thermal transfer foil 80 in transferring the thermal transfer foil 82 onto the transfer object 80 is included in the predetermined region 80T of the transfer object 80. That is, the shape of the thermal transfer foil 82 in transferring the thermal transfer foil 82 onto the transfer object 80 overlaps with a predetermined region 80T of the transfer object 80.

Figure 6:
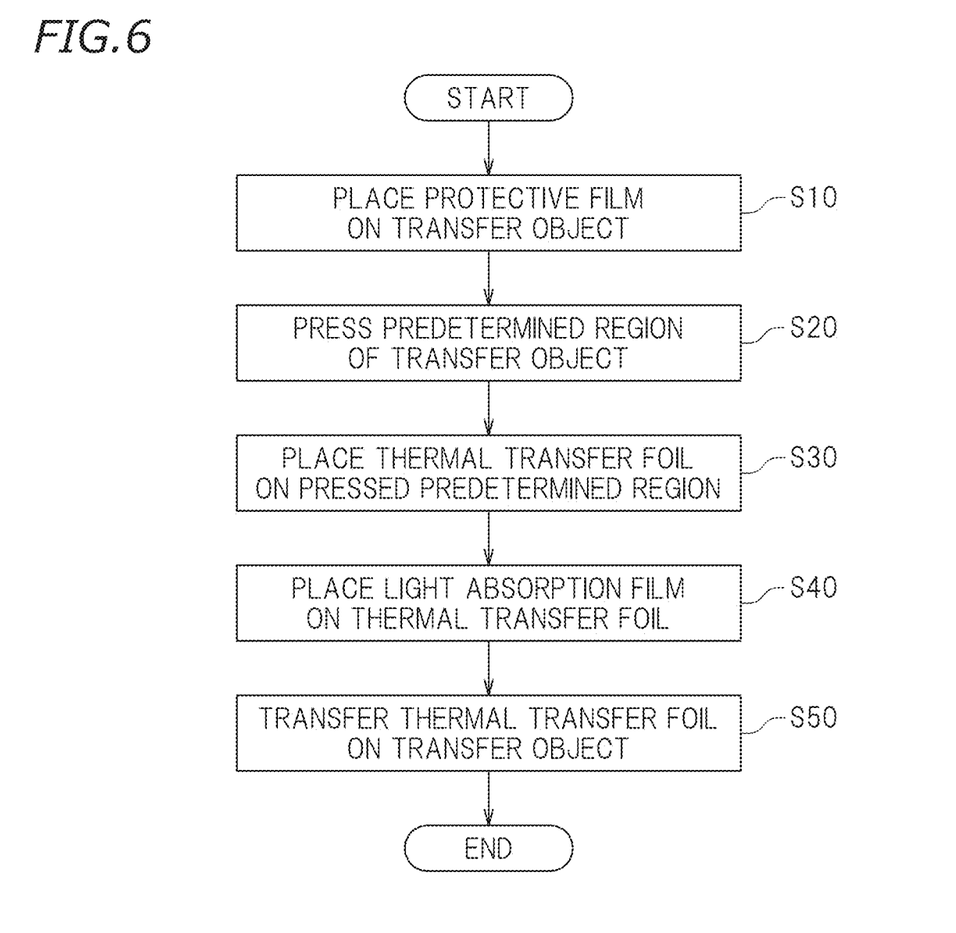
FIG. 6 is a flowchart depicting a flow of transfer according to a preferred embodiment of the present invention.

FIG. 6 is a flowchart depicting a flow of transferring the thermal transfer foil 82 onto the transfer object 80 In this example, the transfer object 80 is pressed with interposition of the protective film 86, and then the thermal transfer foil 82 is transferred onto the transfer object 80 by using the light absorption film 84.

In step S10, the fixture 20 holding the transfer object 80 is attached to the bottom wall 14 of the thermal transfer apparatus 10. Then, the protective film 86 (see FIG. 7) is placed on the transfer object 80. The protective film 86 is placed on at least the predetermined region 80T (see FIG. 7) of the transfer object 80. The predetermined region 80T may be the entire upper surface of the transfer object 80 while the transfer object 80 is held by the fixture 20 or may be a portion of the upper surface of the transfer object 80, for example. The protective film 86 is larger than the predetermined region 80T. The protective film 86 of this preferred embodiment has a light absorption property. The protective film 86 is, for example, a sheet configured to efficiently absorb light in a predetermined wavelength range applied from the light source 62 of the transfer tool 60 and capable of converting optical energy to thermal energy. The protective film 86 has a configuration similar to that of the light absorption film 84, for example.

Figure 7:
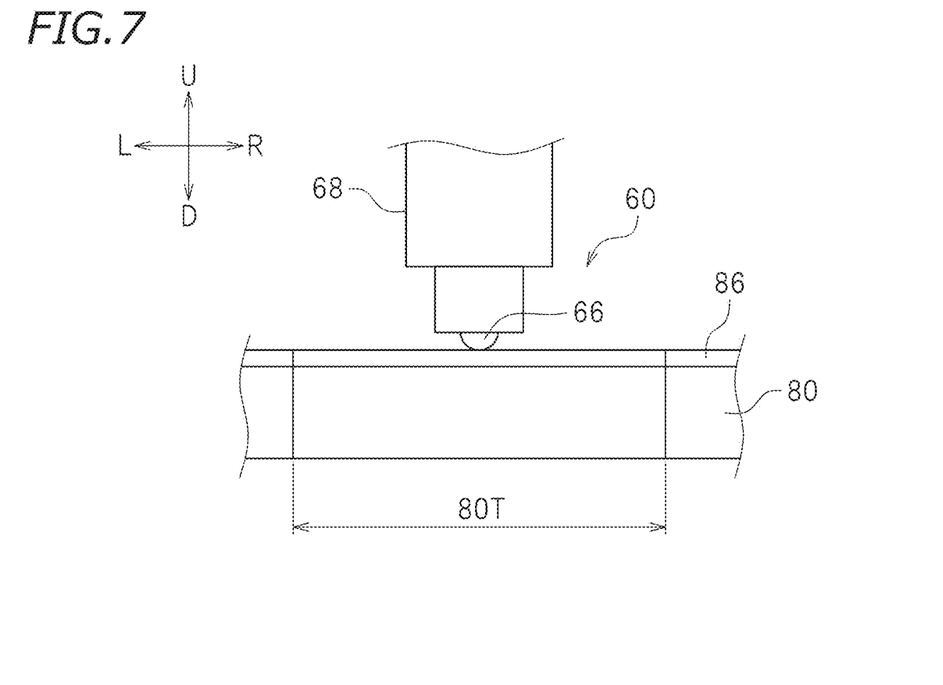
FIG. 7 is a schematic view illustrating a state where a predetermined region of a transfer object is pressed by the transfer tool when a protective film is placed on the transfer object.

In step S20, as illustrated in FIG. 7, the predetermined region 80T of the transfer object 80 is pressed by the transfer tool 60. The first controller 91 controls the pressing body conveyor 22 to press the predetermined region 80T of the transfer object 80. Here, the predetermined region 80T of the transfer object 80 is pressed by the pressing body 66 of the transfer tool 60 with the protective film 86 interposed therebetween. The first controller 91 controls the transfer tool 60 to apply light to the protective film 86. The first controller 91 generally causes the pressing body 66 of the transfer tool 60 to press the predetermined region 80T of the transfer object 80 while (at the same time as) causing the light source 62 of the transfer tool 60 to apply light to the protective film 86. More specifically, light from the light source 62 is applied to a portion of the protective film 86 pressed by the pressing body 66. At this time, in a portion of the protective film 86 irradiated with laser light of the light source 62, the protective film 86 absorbs laser light and converts optical energy to thermal energy. Accordingly, the protective film 86 generates heat, and the heat is transferred to the predetermined region 80T of the transfer object 80. In this manner, the surface of the predetermined region 80T of the transfer object 80 is softened (e.g., melted if the predetermined region 80T is made of a resin material), and becomes smooth by a pressing force of the transfer tool 60.

Based on the first image data stored in the memory 95, the first controller 91 controls the transfer tool 60 and the pressing body conveyor 22. The first controller 91 moves the carriage 21 along the X axis, the Y axis, and the Z axis to move the transfer tool 60. The first controller 91 controls application and stop of laser light from the light source 62. Through the process in the step S20, the predetermined region 80T of the transfer object 80 becomes smooth. After the process in step S20 has been completed, the protective film 86 placed on the transfer object 80 is removed.

In step S30, the thermal transfer foil 82 is placed on the pressed predetermined region 80T. The thermal transfer foil 82 placed here may be larger than the predetermined region 80T or may be disposed only in a portion of the predetermined region 80T.

In step S40, the light absorption film 84 is placed on the thermal transfer foil 82. A support film may be further placed on the light absorption film 84. The light absorption film 84 is, for example, larger than the predetermined region 80T.

Figure 8:
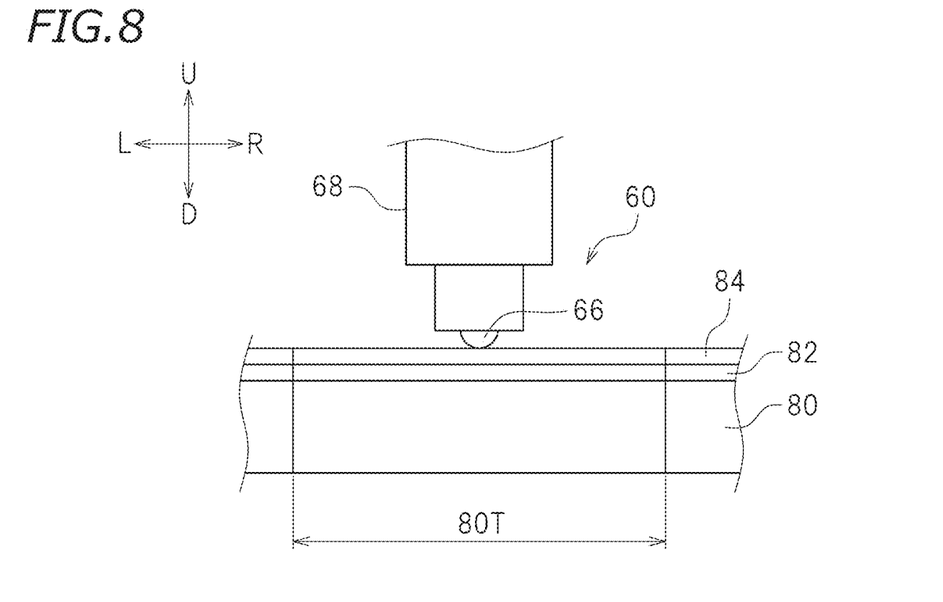
FIG. 8 is a schematic view illustrating a state where thermal transfer foil is transferred by the transfer object when a transfer object and a light absorption film are placed on transfer object.

In step S50, as illustrated in FIG. 8, the transfer tool 60 presses at least a portion of the thermal transfer foil 82 and the light absorption film 84. The second controller 92 controls the pressing body conveyor 22 to press at least a portion of the thermal transfer foil 82 and the light absorption film 84. The second controller 92 controls the transfer tool 60 to apply light to the light absorption film 84. The second controller 92 generally presses the thermal transfer foil 82 and the light absorption film 84 with the pressing body 66 of the transfer tool 60, while (at the same time) applying light from the light source 62 of the transfer tool 60 to the light absorption film 84. More specifically, light from the light source 62 is applied to a portion of the light absorption film 84 pressed by the pressing body 66.

At this time, in a portion of the light absorption film 84 irradiated with laser light of the light source 62, the light absorption film 84 absorbs laser light and converts optical energy to thermal energy. Accordingly, the light absorption film 84 generates heat, and the heat is transferred to the adhesive layer of the thermal transfer foil 82. In this manner, the adhesive layer is softened, and adhesion is able to be obtained. The adhesive layer is attached to the surface of the transfer object 80, and brings the decorative layer of the thermal transfer foil 82 and the transfer object 80 into close contact with each other. Thereafter, the transfer tool 60 is moved or application of laser light from the light source 62 is stopped, thus finishing supply of optical energy to this irradiated portion. Then, the adhesive layer is cooled by heat dissipation and is hardened. Consequently, the decorative layer and the surface of the transfer object 80 are fixed to each other.

Based on the second image data stored in the memory 95, the second controller 92 controls the transfer tool 60 and the pressing body conveyor 22. In controlling movement of the transfer tool 60 by the second controller 92, the transfer tool 60 may move the entire predetermined region 80T or may move only a portion of the predetermined region 80T. The second controller 92 moves the carriage 21 along the X axis, the Y axis, and the Z axis to move the transfer tool 60. The second controller 91 controls application and stop of laser light from the light source 62. After the process in step S50, the light absorption film 84 and the base material of the thermal transfer foil 82 placed on the transfer object 80 are removed. Consequently, a transfer object 80 in which a desired pattern or the like by the thermal transfer foil 82 is appropriately transferred onto the pressed surface of the predetermined region 80T can be obtained.

As described above, the thermal transfer apparatus 10 according to this preferred embodiment includes the controller 92 including the first controller 91 and the second controller 92. The first controller 91 controls the pressing body conveyor 22 to press the predetermined region 80T of the transfer object 80. As described above, since the predetermined region 80T is pressed by the transfer tool 60 before the thermal transfer foil 82 is transferred onto the predetermined region 80T of the transfer object 80, the predetermined region 80T of the transfer object 80 is smoother than that before being pressed. Then, the second controller 92 controls the transfer tool 60 such that the thermal transfer foil 82 and the light absorption film 84 disposed on the smooth predetermined region 80T are pressed, and (at the same time) light is applied to the light absorption film 84. Accordingly, the thermal transfer foil 82 is more appropriately transferred onto the predetermined region 80T of the transfer object 80.

In the thermal transfer apparatus 10 according to this preferred embodiment, the protective film 86 is placed on the transfer object 80. The first controller 91 of the controller 90 controls the pressing body conveyor 22 to press the predetermined region 80T of the transfer object 80 with the protective film 86 interposed therebetween. In this manner, since the transfer tool 60 presses the predetermined region 80T indirectly with the protective film 86 interposed therebetween, abrasion of a pressed portion (pressing body 66 in this case) of the transfer tool 60 is able to be reduced, as compared to a case where the transfer tool 60 contacts the transfer object 80 to press the predetermined region 80T directly.

In the thermal transfer apparatus 10 of this preferred embodiment, the protective film 86 has a light absorption property. The first controller 91 of the controller 90 controls the transfer tool 60 and the pressing body conveyor 22 such that the predetermined region 80T of the transfer object 80 is pressed with the protective film 86 interposed therebetween and, at the same time, light is applied to the protective film 86. While the transfer tool 60 presses the predetermined region 80T indirectly, light is applied to the protective film 86. Thus, heat generated in the protective film 86 is conducted to the predetermined region 80T. In this manner, the predetermined region 80T of the transfer object 80 is pressed with application of heat, and thus, the surface thereof becomes smoother.

In the thermal transfer apparatus 10 according to the present preferred embodiment, the predetermined region 80T of the transfer object 80 includes a resin material. Since the resin material of the predetermined region 80T is melted with heat, the surface of the predetermined region 80T becomes smoother.

The foregoing description is directed to the preferred embodiments of the present invention. The preferred embodiments described above, however, are merely examples, and the present invention can be performed in various modes.

In the preferred embodiments described above, the protective film 86 is used in pressing the predetermined region 80T of the transfer object 80. However, the present invention is not limited to this. The protective film 86 may not be used, and the predetermined region 80T of the transfer object 80 may be pressed directly with the transfer tool 60. Tools other than the transfer tool 60 may be used so that an operator is able to manually press the predetermined region 80T of the transfer object 80.

In the preferred embodiments described above, the protective film 86 is used in pressing the predetermined region 80T of the transfer object 80, and the light absorption film 84 is used in transferring the thermal transfer foil 82 onto the transfer object 80. However, the present invention is not limited to this. The light absorption film 84 may be used instead of the protective film 86 in pressing the predetermined region 80T of the transfer object 80 with the previously used light absorption film 84 being used again in transferring the thermal transfer foil 82 onto the transfer object 80. In this case, the first controller 91 is able to control the light source 62 of the transfer tool 60 such that a first quantity of light applied to the light absorption film 84 in pressing the predetermined region 80T of the transfer object 80 (quantity of light in step S20 of the flowchart) is smaller than a second quantity of light applied to the light absorption film 84 in transferring the thermal transfer foil 82 onto the transfer object 80 (quantity of light in step S50 of the flowchart). For example, the first quantity of light is about 70% to about 95% (e.g., about 90%) of the second quantity of light. Accordingly, degradation of the light absorption film 84 is able to be reduced with appropriate heat being applied to the predetermined region 80T of the transfer object 80.

In the preferred embodiments described above, the protective film 86 has a light absorption property similarly to the light absorption film 84. However, the present invention is not limited to this. The protective film 86 may have a significantly low light absorption property similarly to the support film. In a case where light is applied from the transfer tool 60 to the transfer object 80 in pressing the predetermined region 80T of the transfer object 80, the protective film 86 preferably has a light transmittance. The protective film 86 is preferably made of a material transparent to laser light emitted from the light source 62. The protective film 86 is preferably a transparent member having a high light transmittance, for example. The transfer object 80 preferably has a light absorption property. In this case, the first controller 91 controls the transfer tool 60 and the pressing body conveyor 22 such that the predetermined region 80T of the transfer object 80 is pressed with interposition of the protective film 86 and, at the same time, light is applied to the protective film 86. In this manner, while the predetermined region 80T is indirectly pressed by the transfer tool 60, light that has passed through the protective film 86 is applied to the transfer object 80, and thus, heat is generated in the predetermined region 80T of the transfer object 80. In this manner, the predetermined region 80T of the transfer object 80 is pressed with generation of heat so that the surface thereof becomes smoother.

In the preferred embodiments, the pressing body 66 of the transfer tool 60 moves relative to the fixture 20. However, the present invention is not limited to this example. In the thermal transfer apparatus 10, the fixture 20 may move relative to the pressing body 66 or both the fixture 20 and the pressing body 66 may be movable. For example, the fixture 20 may be movable along the X axis with the pressing body 66 being movable along the Y axis and the Z axis.

In the preferred embodiments described above, the pressing body 66 is a sphere. The pressing body 66, however, is not limited to this shape. For example, the pressing body 66 may be a hemisphere or a rectangular parallelepiped.

In the preferred embodiments described above, the controller 90 includes the first controller 91 to perform predetermined control and the second controller 92 to perform predetermined control. However, the present invention is not limited to this. The controller 90 may be configured or programmed such that control by the first controller 91 and control by the second controller 92 are performed by one controller.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principles of the present invention. These preferred embodiments are provided with the understanding that they are not intended to limit the present invention to the preferred embodiments described in the specification and/or shown in the drawings. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or described during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A thermal transfer apparatus comprising:
    a stand to hold a transfer object;
    a transfer tool comprising a pressing body configured both to press the transfer object and to apply light to the transfer object;
    a conveyor to move one of the stand and the transfer tool relative to the other; and
    a controller to control the transfer tool and the conveyor; wherein
    the controller is programmed to:
        control at least the conveyor such that a predetermined region of the transfer object is pressed by the pressing body of the transfer tool without interposing a thermal transfer foil between the transfer tool and the predetermined region of the transfer object; and
        control the transfer tool and the conveyor such that at least a portion of a thermal transfer foil placed on the predetermined region pressed by the pressing body of the transfer tool and a light absorption film having a light absorption property and placed on the thermal transfer foil is pressed by the pressing body of the transfer tool, and light is applied to the light absorption film.

2. The thermal transfer apparatus according to claim 1, wherein
    a protective film is placed on the transfer object; and
    the controller controls at least the conveyor such that the predetermined region of the transfer object is pressed by the pressing body of the transfer tool with interposition of the protective film.

3. The thermal transfer apparatus according to claim 2, wherein
    the protective film has a light absorption property; and
    the controller controls the transfer tool and the conveyor such that the predetermined region of the transfer object is pressed with interposition of the protective film, and light is applied to the protective film.

4. The thermal transfer apparatus according to claim 3, wherein in a case where the light absorption film is used as the protective film:
    the controller controls the transfer tool such that a first quantity of light applied to the light absorption film in pressing the predetermined region of the transfer object is smaller than a second quantity of light applied to the light absorption film in transferring the thermal transfer foil to the transfer object.

5. The thermal transfer apparatus according to claim 2, wherein
    the protective film has a light transmittance;
    the transfer object has a light absorption property; and
    the controller controls the transfer tool and the conveyor such that the predetermined region of the transfer object is pressed with interposition of the protective film, and light is applied to the protective film.

6. The thermal transfer apparatus according to claim 3, wherein the predetermined region of the transfer object includes a resin material.

* * * * *